United States Patent
Babu et al.

(10) Patent No.: US 10,317,314 B2
(45) Date of Patent: Jun. 11, 2019

(54) FIBER OPTIC CONNECTOR TERMINATION TOOL

(71) Applicant: Panduit Corp., Tinley Park, IL (US)

(72) Inventors: Surendra Chitti Babu, New Lenox, IL (US); Yu Huang, Orland Park, IL (US); Roman J. Churnovic, Joliet, IL (US); Scott R. Hartman, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/668,961

(22) Filed: Aug. 4, 2017

(65) Prior Publication Data

US 2018/0058980 A1 Mar. 1, 2018

Related U.S. Application Data

(60) Provisional application No. 62/378,298, filed on Aug. 23, 2016, provisional application No. 62/476,964, filed on Mar. 27, 2017.

(51) Int. Cl.
*G01M 11/08* (2006.01)
*G02B 6/38* (2006.01)
*G01M 11/00* (2006.01)

(52) U.S. Cl.
CPC .......... *G01M 11/088* (2013.01); *G01M 11/30* (2013.01); *G02B 6/385* (2013.01)

(58) Field of Classification Search
None
See application file for complete search history.

(56) References Cited

U.S. PATENT DOCUMENTS

| | | | |
|---|---|---|---|
| 7,192,195 B2 | 3/2007 | Turner | |
| 7,680,384 B2 | 3/2010 | Billman et al. | |
| RE42,094 E | 2/2011 | Barnes et al. | |
| 8,094,988 B2 | 1/2012 | Billman et al. | |
| 9,618,707 B2* | 4/2017 | Leyva, Jr. | G02B 6/3898 |
| 2015/0063756 A1 | 3/2015 | Hallett et al. | |
| 2015/0063757 A1 | 3/2015 | Leyva, Jr. et al. | |
| 2015/0063761 A1* | 3/2015 | Hallett | G02B 6/3826 385/86 |
| 2016/0033325 A1 | 2/2016 | Fusco et al. | |

FOREIGN PATENT DOCUMENTS

| | | |
|---|---|---|
| EP | 590868 A1 | 4/1994 |
| EP | 2259112 A1 | 12/2010 |
| WO | WO 01/61317 A1 | 8/2001 |

\* cited by examiner

*Primary Examiner* — Sung H Pak
(74) *Attorney, Agent, or Firm* — Christopher S. Clancy; James H. Williams; Christopher L. Marlow

(57) ABSTRACT

A tool for testing the termination of optical connectors has a housing, a cradle attached to the housing, and a cover removeably attached to the cradle. The cradle is configured to restrain a fiber optic connector and the cover is configured to at least partially block ambient light from reaching the fiber optic connector. In another embodiment, a tool for testing the termination of optical connectors has a housing, a cradle attached to the housing, a launch fiber, and a ferrule adapter. The ferrule adapter is connected such that it rotates about a pivot point on the cradle.

2 Claims, 24 Drawing Sheets

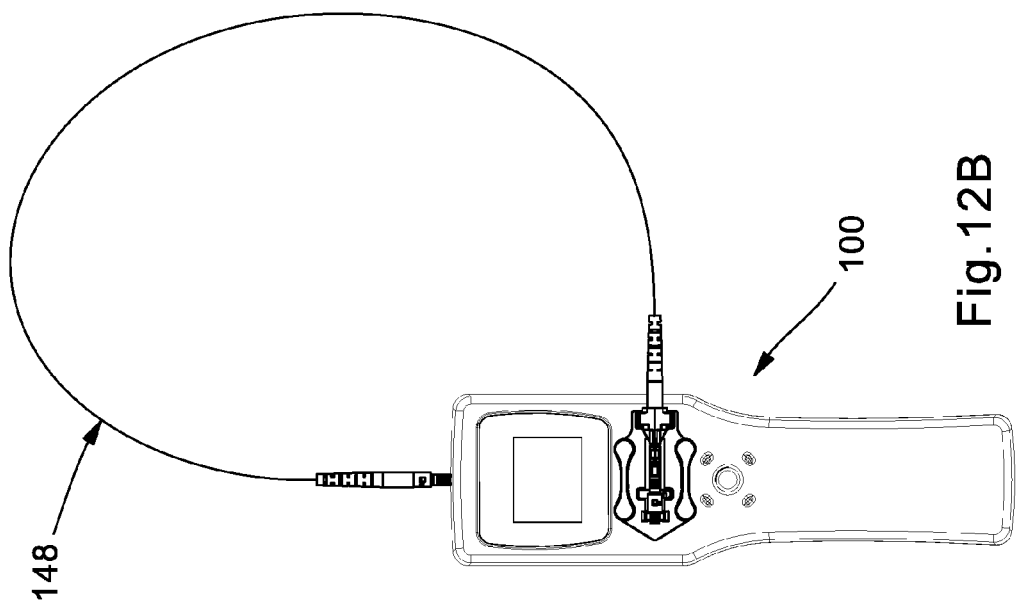
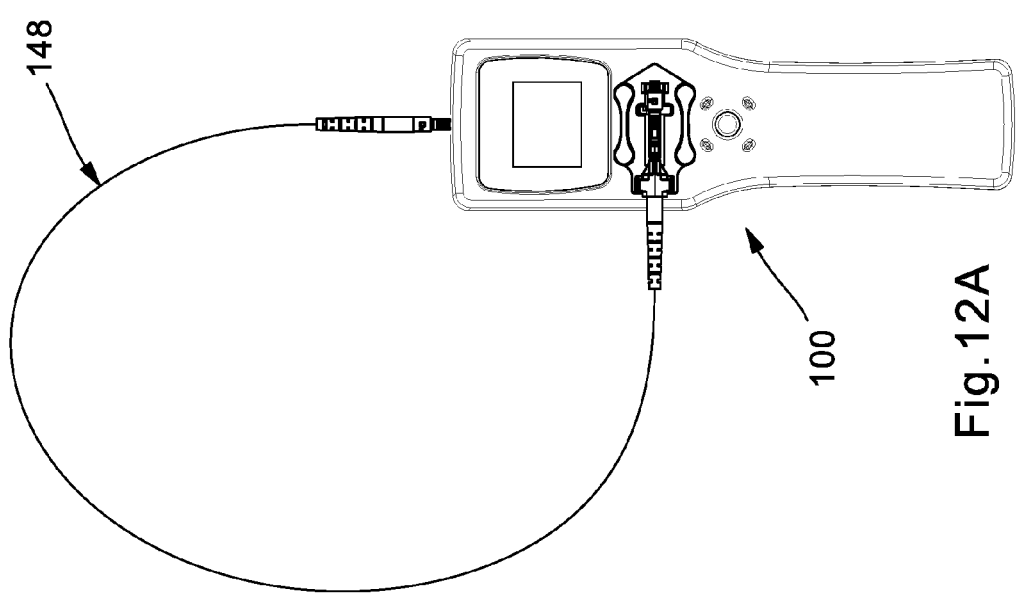

FIBER OPTIC CONNECTOR TERMINATION TOOL

CROSS REFERENCE TO RELATED APPLICATIONS

This application claims priority to U.S. Provisional Application No. 62/378,298, filed Aug. 23, 2016 and U.S. Provisional Application No. 62/476,964, filed Mar. 27, 2017, the subject matter of which is hereby incorporated by reference in its entirety.

FIELD OF INVENTION

Embodiments of the present invention relate to the field of fiber optic cable termination, and more specifically, to tools which assist a user with installing field terminable connectors and methods associated therewith.

BACKGROUND

When working in the field of fiber optics, users are often required to establish connections between non-connectorized ends of optical fibers or fiber ribbons. This is generally referred to as splicing and it involves creating temporary or permanent joints between two fibers. In certain instances, the two fibers are precisely aligned and then fused together using localized intense heat often times created with an electric arc. This is referred to as fusion splicing and is widely employed to create high performance permanent joints between two optical fibers. However, fusion splicer apparatuses are somewhat bulky, expensive, and relatively fragile. Alternatively, the two fibers may simply abut one another in an alignment fixture often referred to as a mechanical splice. The alignment fixture may be an alignment tube or V-groove which receives two ends of separate fibers on either side and has the means of physically securing the fibers. In other instances, the alignment device may be a fiber optic connector with a stub fiber embedded therein made to be connectorized to a field fiber. In this case the field fiber can be terminated utilizing a mechanical splice to the stub fiber inside the connector.

In order to avoid significant loss of signal and minimize the potential reflectance or light leakage within these joints, users must ensure that the fiber(s) are properly cleaved, that there is precise alignment between the fibers, and that transparent gel or optical adhesive applied between the fibers matches the optical properties of the glass. However, these details are not always easy to detect and/or ensure.

Various approaches have been developed to assist users with the task of terminating fiber optic cables. For example, U.S. patent application Ser. No. 14/920,270 entitled "Apparatus and Method for Terminating and Testing Connectors" and U.S. Patent Application Ser. No. 62/370,379 entitled "Methods and Devices for Evaluating Optical Fiber Splices," both of which are incorporated herein by reference in their entirety, describe concepts directed towards evaluating the connector in order to prove appropriate information regarding the splice. However, the disclosure in these applications focuses on the overall approach for fiber optic termination and does relatively little to physically define a tool that would be used for the intended purpose.

Therefore, there is a need for apparatuses and methods directed towards helping to determine and improve the quality of mechanical splices and provide improved termination of field fibers.

SUMMARY

Accordingly, embodiments of the present invention are directed towards apparatuses, systems, and methods associated with fiber optic cable termination and the tools used therefor.

These and other features, aspects, and advantages of the present invention will become better understood with reference to the following drawings, description, and any claims that may follow.

BRIEF DESCRIPTION OF THE DRAWINGS

FIGS. 12A and 12B illustrate ambidextrous functionality of a termination tool according to an embodiment of the present invention.

DETAILED DESCRIPTION

Figure 1A:
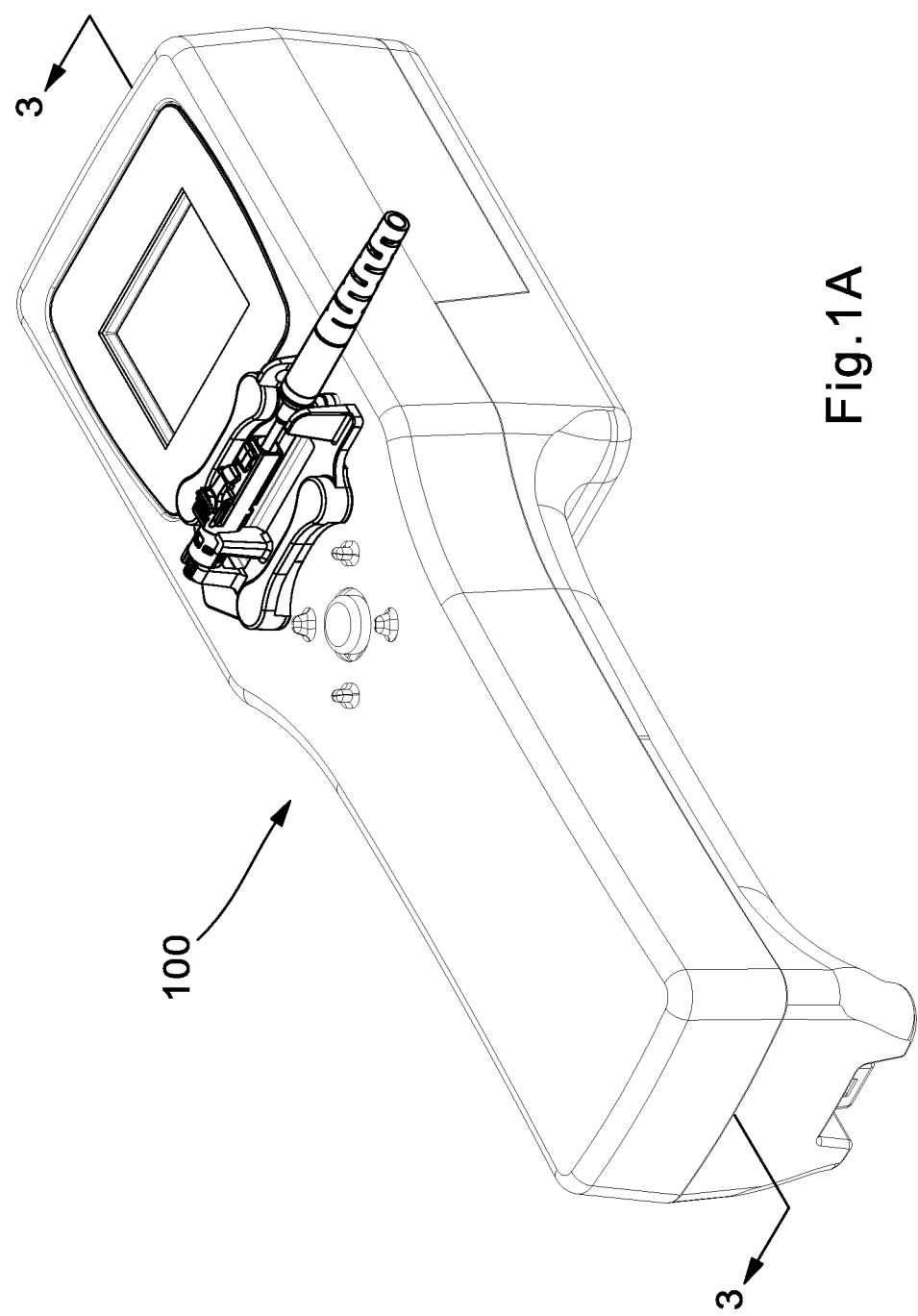
FIG. 1A is a perspective view of a termination tool according to an embodiment of the present invention.
Figure 1C:
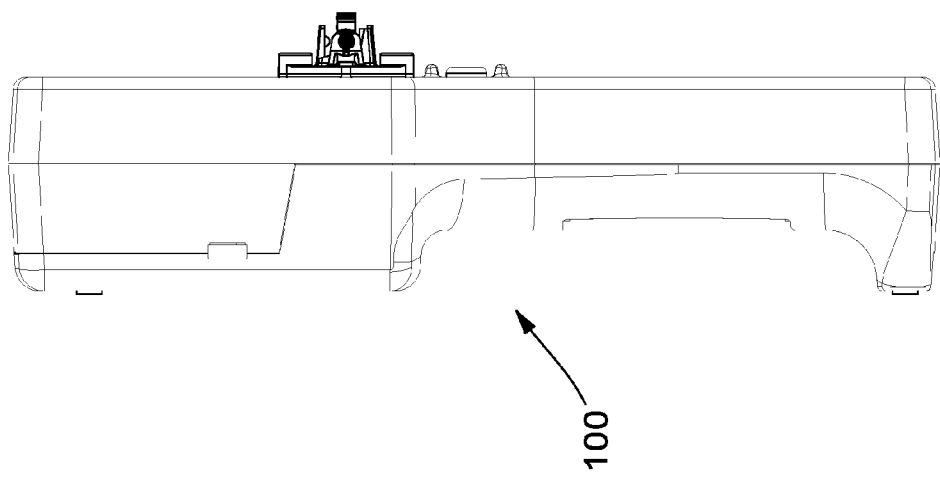
FIG. 1C is a side view of the termination tool of FIG. 1A.
Figure 1B:
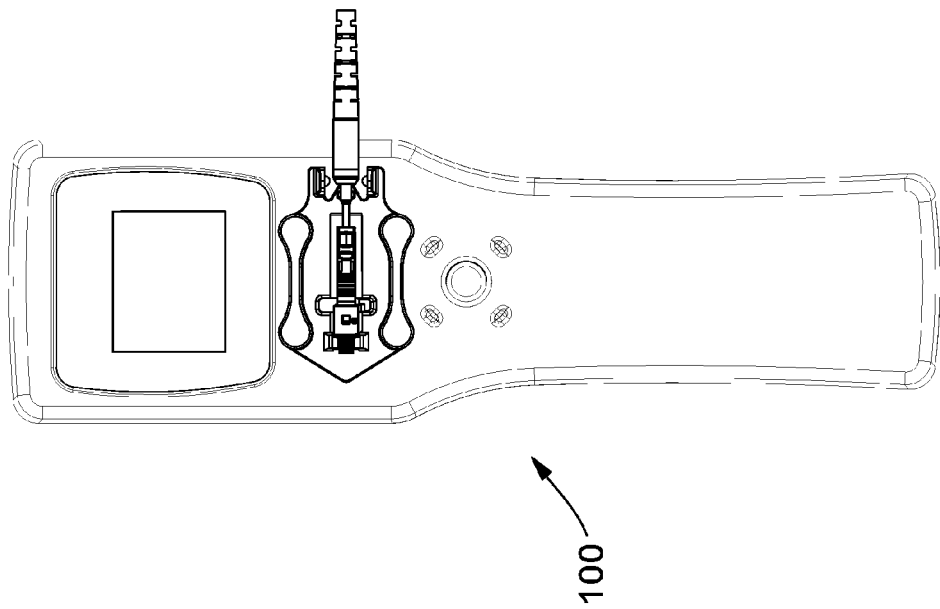
FIG. 1B is a top view of the termination tool of FIG. 1A.

Referring to FIGS. 1A-1C, shown therein is an exemplary embodiment of a termination tool 100 with FIG. 1A showing a perspective view, FIG. 1B showing a top view, and FIG. 1C showing a side view.

Figure 2:
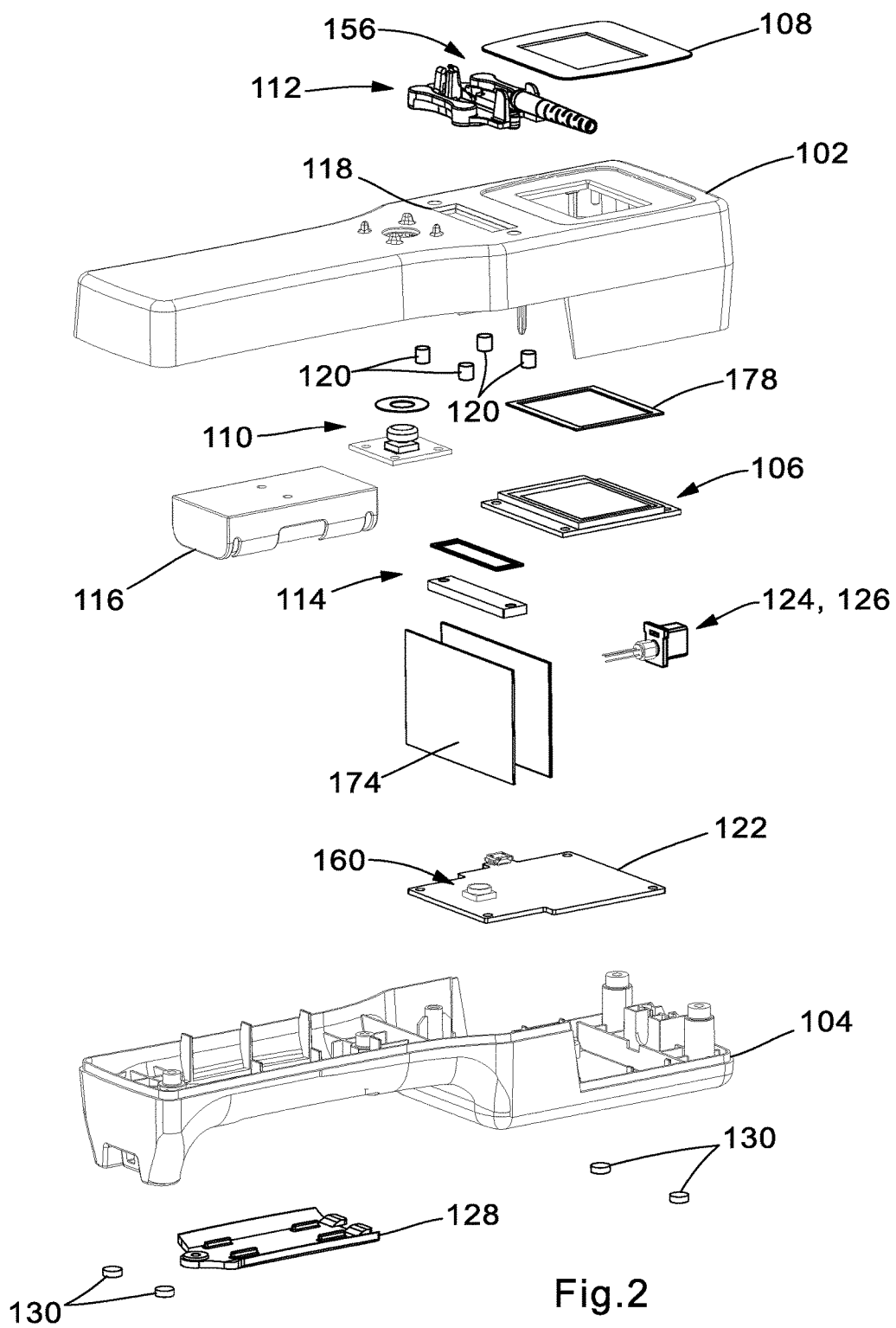
FIG. 2 is an exploded perspective view of the termination tool of FIG. 1A.
Figure 3:
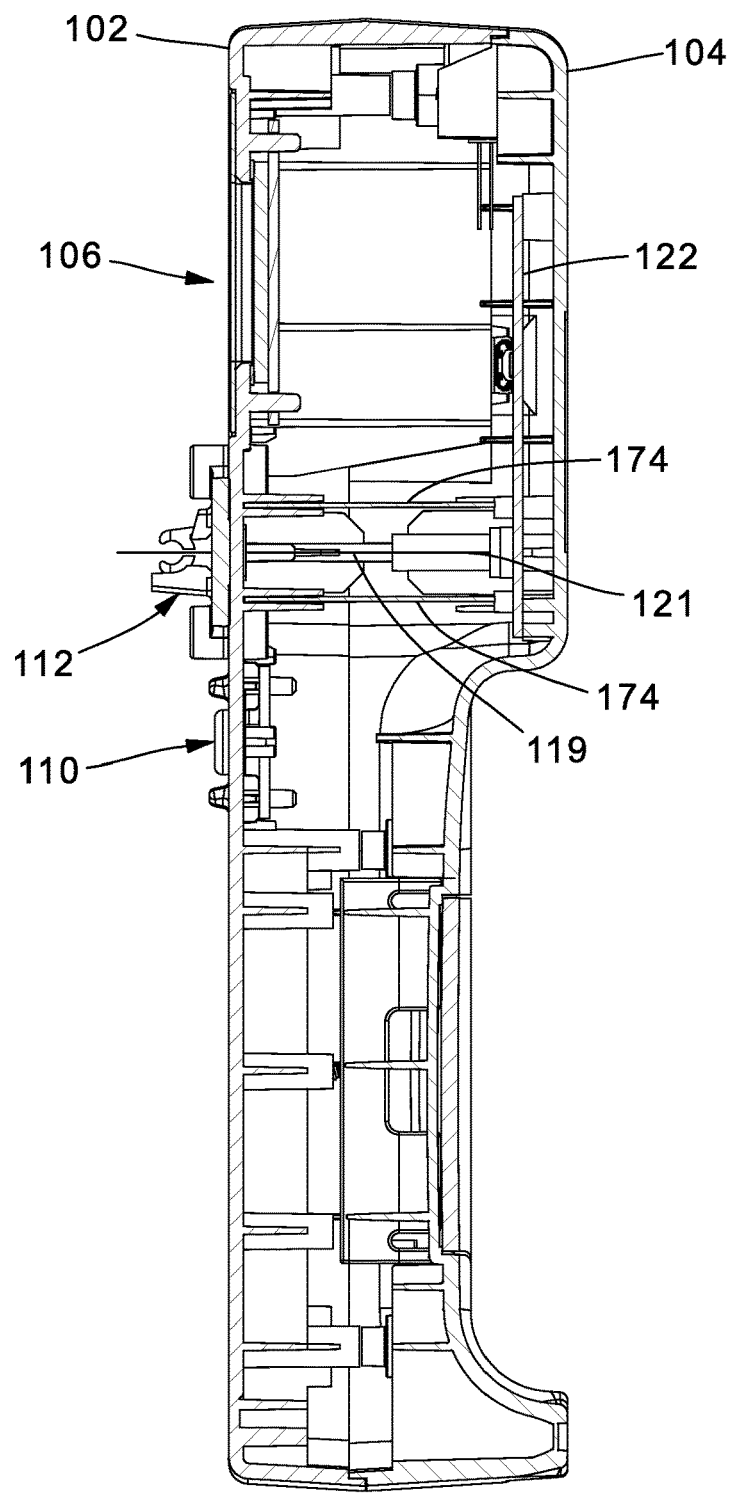
FIG. 3 is a cross section side view of the termination tool of FIG. 1A.
Figures 4A, 4B:
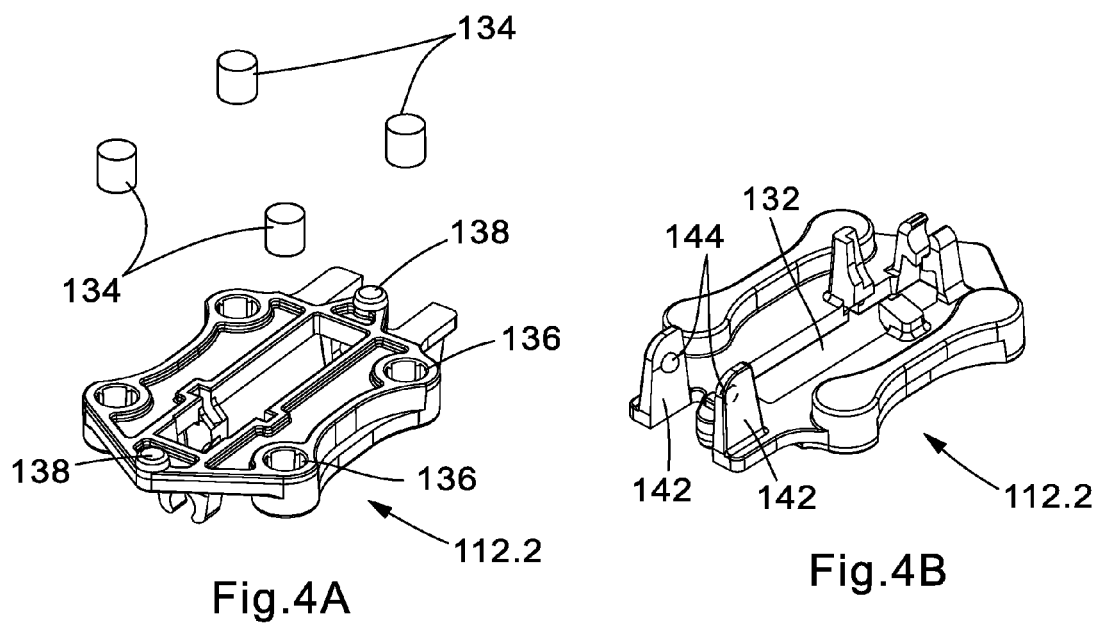
FIG. 4A is a bottom perspective view of a cradle according to an embodiment of the present invention.
FIG. 4B is a top perspective view of the cradle of FIG. 4A.
Figure 5:
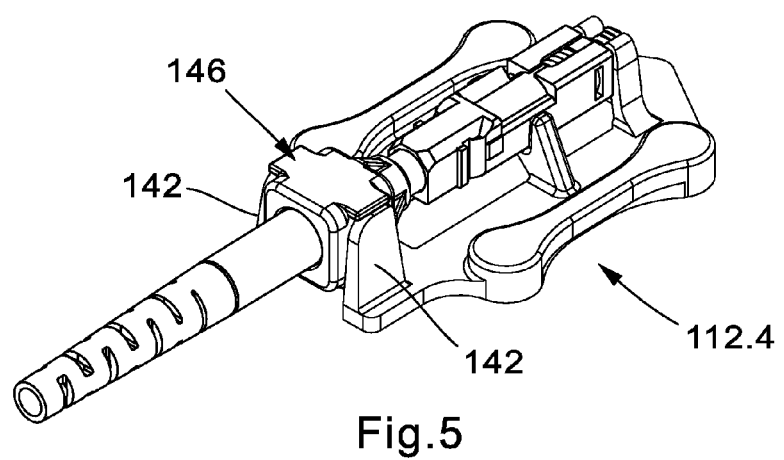
FIG. 5 is a top perspective view of a connector installed in a cradle according to an embodiment of the present invention.
Figure 6:
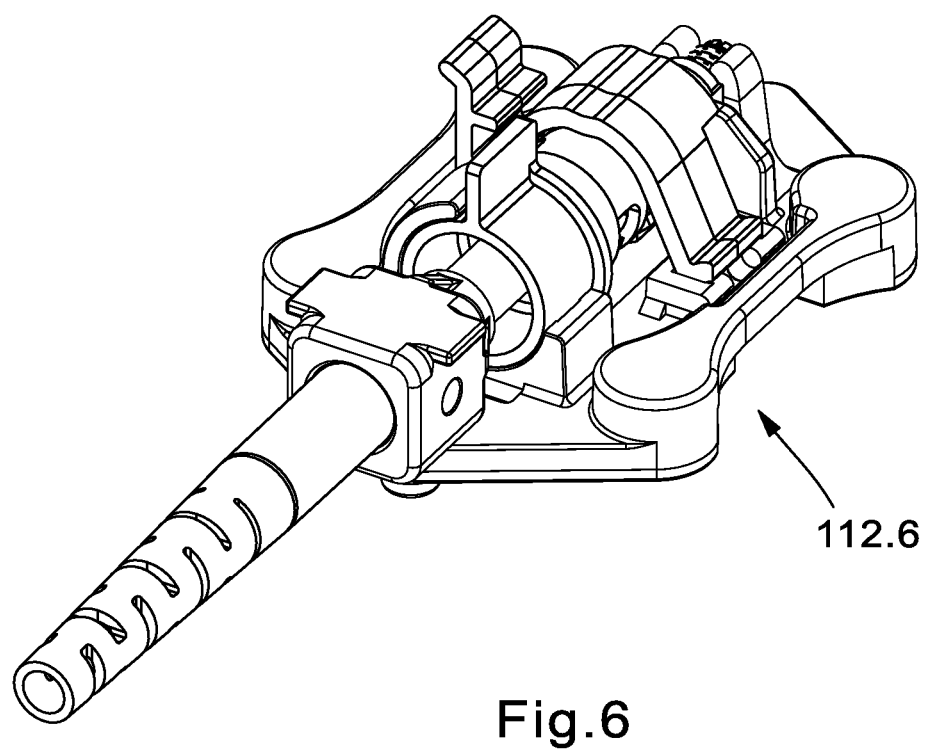
FIG. 6 is a top perspective view of a connector installed in a cradle according to an embodiment of the present invention.

As shown in FIG. 2, the termination tool 100 includes a top housing 102 and a bottom housing 104. The top housing 102 holds a liquid crystal display (LCD) 106 with bezel 108, navigation switch 110, cradle 112 for the connector under evaluation, IR Filter 114, and battery housing 116. It also has an optical window 118 through which the image capture system captures the images of the connector under evaluation. Alignment pins 119 in the top housing 102 and alignment holes 121 in the bottom housing 104 (see FIG. 3) help align both housings 102 and 104 during joining. Four magnets 120 attached to top housing 102 help to align and magnetically hold the cradle 112 during the termination process. The bottom housing 104 houses the primary printed circuit board (PCB) 112, the transmitter optical sub-assembly (TOSA) 124, launch fiber adapter 126, battery door 128, and anti-skid pads 130.

As shown, the termination tool 100 includes three type of cradles, shown in FIGS. 4A-6. These cradles 112.2, 112.4, and 112.6 are designed for LC, SC, and ST fiber optic connectors, respectively. While only three cradles are illustrated, it should be understood that any number of cradles may be adapted to work with the tool where said cradles are configured for specific types of single or multi-fiber connectors. Each cradle 112 has an optical window 132 at its base through which the connector under evaluation can be seen by an image capture system.

Figure 7:
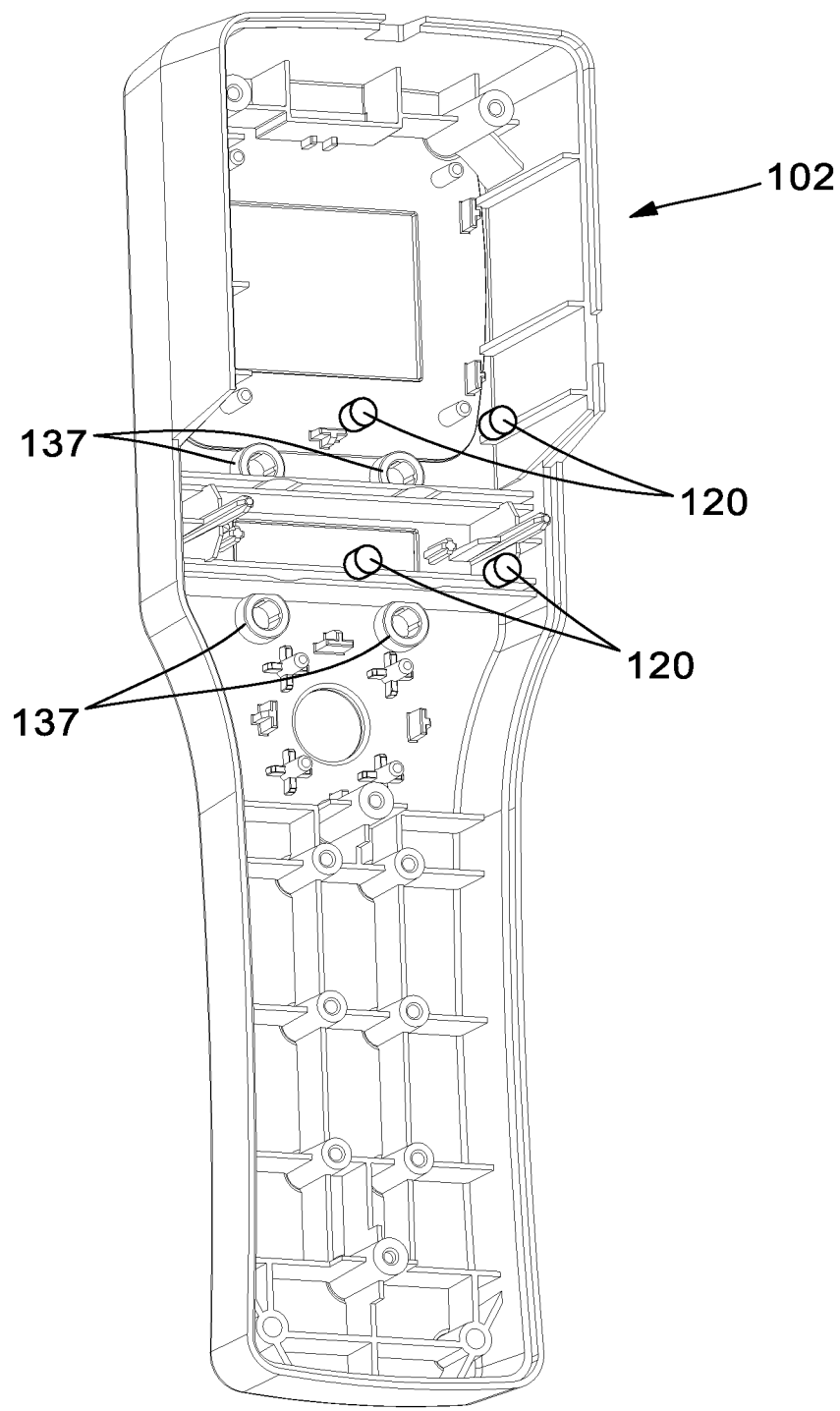
FIG. 7 is a bottom perspective view of the top housing according to an embodiment of the present invention.

In order to attach the cradles 112 to the top housing 102, four magnets 134 are housed inside each cradle. They can be inserted into respective magnet cavities 136 and retained therein by press-fitting, adhesive, or other securing means. When installed, the magnets are spaced apart in the same manner as magnets 120 installed in the top housing 102. The positioning of magnets 120 into the respective magnet pockets 137 of top housing 102 can be seen in FIG. 7. The same relative positioning of the magnets in each magnet set allows the cradle to be attracted, and to some extent secured, to the top housing 102 by magnets 120 and 134 being attracted to each other. It is important to note that to have the magnets 120 and magnets 134 attract each other, they must be installed in a proper pole orientation. That is to say that the poles of any two respective magnets 120/134 should be opposite (N-S or S-N).

Figure 8:
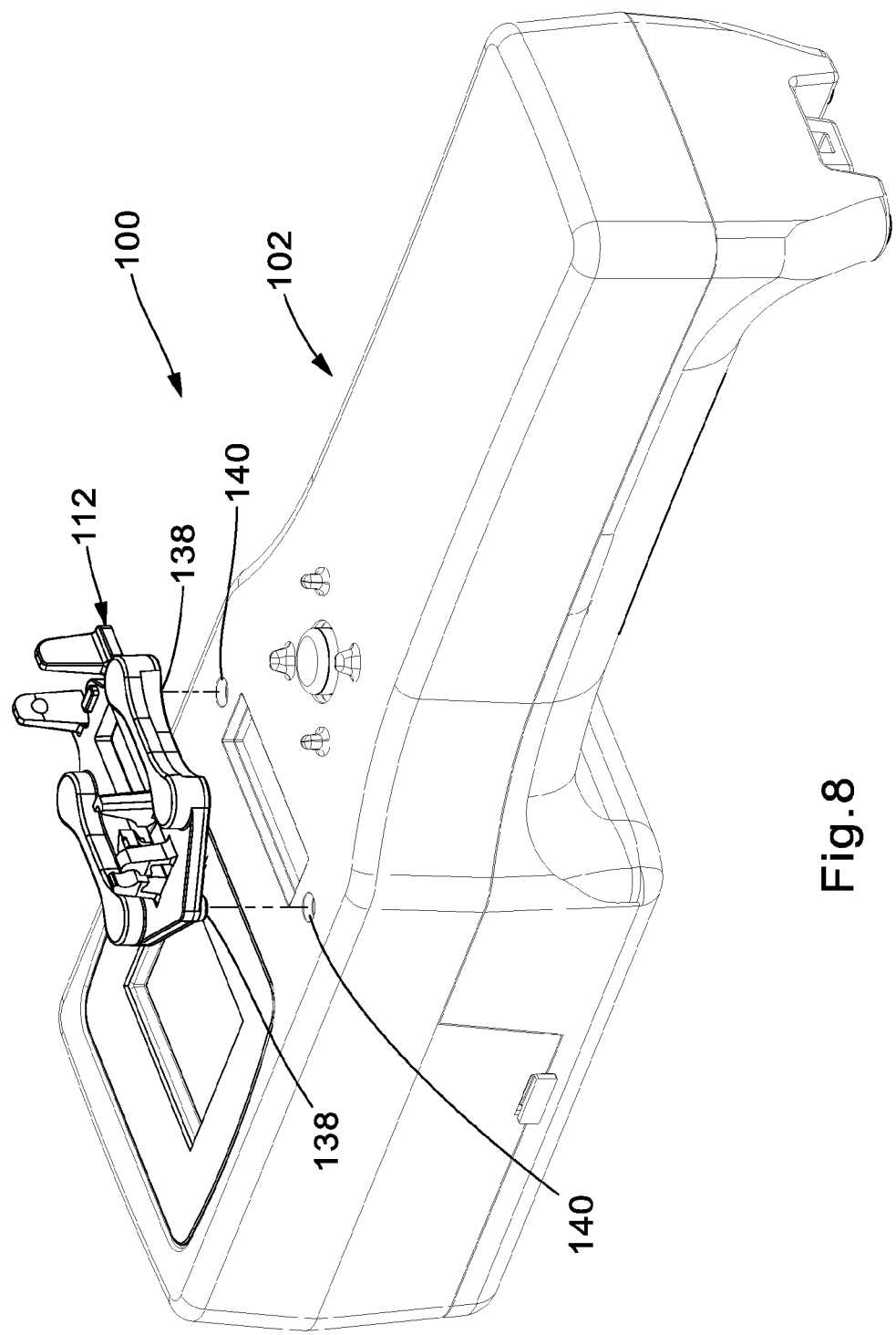
FIG. 8 is a perspective view of the alignment of a cradle in relation to a termination tool according to an embodiment of the present invention.

Cradles 112 are precisely positioned over the optical window 118 in top housing 102 by means of alignment features in each cradle 112 and top housing 102. In the case of the illustrated embodiment(s), these alignment features are the alignment pins 138 that are designed in the cradles 112 (see FIG. 4A) and corresponding alignment holes 140 that are designed in the top housing 102 (see FIG. 8). This alignment design coupled with magnetic method of attaching the cradles 112 to top housing 102 enables easy and hassle-free, yet precise, alignment of the cradles 112 over the optical window 118; when a user drops or positions the cradle 112 near the optical window 118 of top housing 102, the cradle 112 self-aligns through the magnetic interaction and the alignment features, and attaches securely via magnetic attraction. Note that in this case "secured" refers to unintentional movement of the cradle due to installation of the connector under evaluation into the cradle, movement of the tool, or other similar occurrences. The user is still able to dislodge the cradle from the top housing by applying force sufficient to break the magnetic attraction between the magnets in the cradle and the top housing. This design may reduce the dependence on user's skill to position the cradles 112 in the appropriate location on the top housing 102.

Referring back to FIG. 4B, LC cradle 112.2 and SC cradle 112.4 are designed to have two upright beams with hemispherical projections 144 on the oppositely facing walls of said beams. When paired with ferrule adapters 146 of launch fiber 148 (see FIG. 10) having corresponding hemispherical recesses 150, the interaction between the cradle and the adapter forms a ball-socket joint, enabling the cradle to pivot through a range of angles (see FIG. 11).

In practice, termination tool 100 delivers light generated by the TOSA 124 to the connector under evaluation via the launch fiber 148 and thereafter evaluates the light emission pattern(s) from said connector to deliver termination-related information to the user. In an embodiment, TOSA 124 emits infrared (IR) light at a predetermined wavelength. In other embodiments, the wavelength of the light emitted by the TOSA 124 may be adjusted as necessary/desired and may fall within the visible or ultraviolet spectrums.

Figure 9:
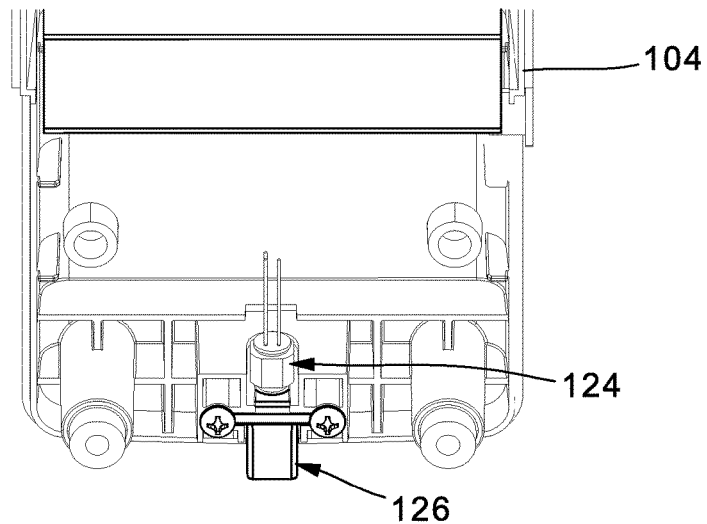
FIG. 9 is a view of a TOSA and launch fiber adapter attached to a top housing according to an embodiment of the present invention.
Figure 10:
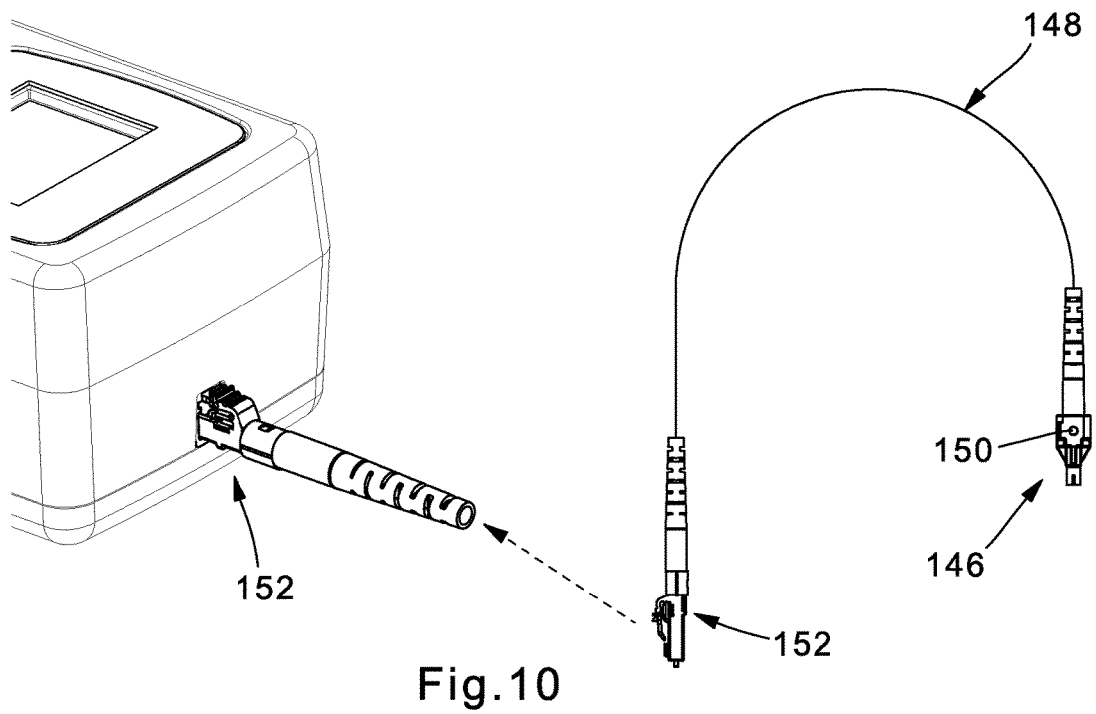
FIG. 10 illustrates a launch fiber and its attachment to a termination tool according to an embodiment of the present invention.
Figure 11:
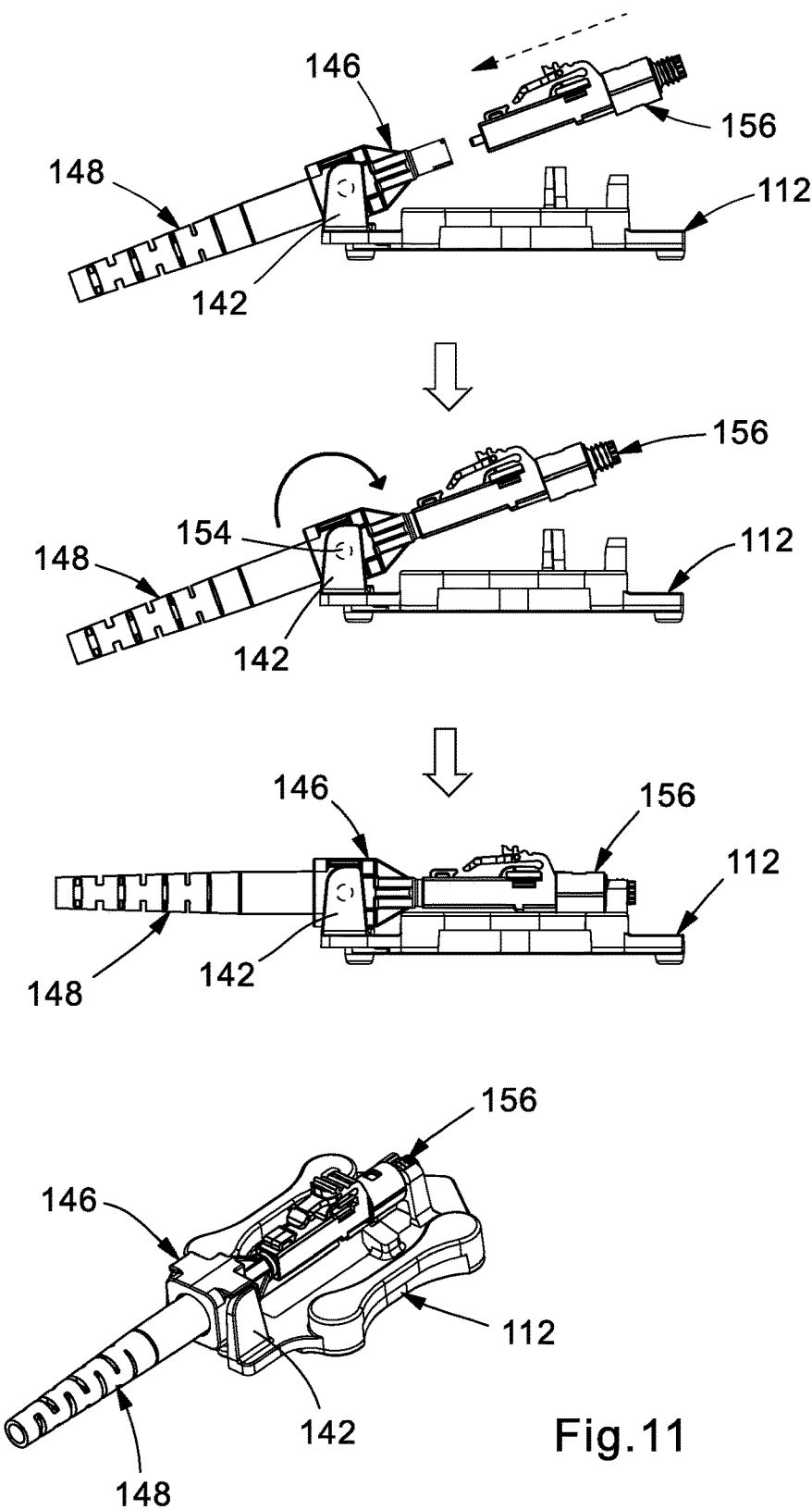
FIG. 11 illustrates a process of attaching a connector to a cradle according to an embodiment of the present invention.

Referring to FIG. 9, TOSA 124 is connected to the primary PCB 122 with its ferrule inserted into the launch fiber adapter 126, which in the current embodiment is shown as an LC adapter. Launch fiber 148 is used to transmit light from TOSA 124 to the connector under evaluation. One end of the launch fiber 148 is terminated with a connector 152 (e.g., standard LC connector) configured to connect to the launch fiber adapter 126, as shown in FIG. 10. The other end of the launch fiber 148 is terminated with ferrule adapter 146 (e.g., 1.25 mm ferrule adapter for LC connectors or 2.5 mm ferrule adapter for SC and ST connectors) that connects to cradles 112 and ultimately to the connectors under evaluation, as shown in FIG. 11. The ferrule adapter 146 includes hemispherical recess 150 such that it snaps between the two upright beams 142 of cradle 112 creating a ball-socket joint between them. Once installed in the cradle 112, launch fiber 148 can pivot about the rotation point 154 to facilitate the insertion of the connector under evaluation 156. For instance, the pivoting design can allow the ferrule adapter 146 to be angled upwards to provide a more convenient angle of insertion for the user inserting the connector 156. Then, once connector 156 is inserted into the ferrule adapter 146, both components are swung downwards into a restrained position, seating the connector under evaluation 156 in an appropriate location over the optical windows 118 and 132 for proper termination and evaluation.

Cradle 112 is designed in such a way that it can be positioned over the optical window in two directions, as shown in FIG. 12. Alignment features and magnet retention features between the cradles 112 and the top housing 102 are designed to be symmetric about the mid plane of optical windows 118 and 132. Combining this with correct positioning of the tool's imaging components (e.g., central to the optical windows 118 and 132) may allow for easier right-handed and/or left-handed operation.

The imaging components of the termination tool 100 include the primary PCB 122 which has, among other components, a camera sensor 158, lens system 160, microprocessor 162, and micro-USB port 164. The camera sensor 158 is embedded on the primary PCB 122 with the lens system 160 being centered directly above it. To assist with proper alignment of the lens system 160, lens holder 166 (which is part of the lens system 160) is provided with a plurality of alignment pins 168.

Figure 13:
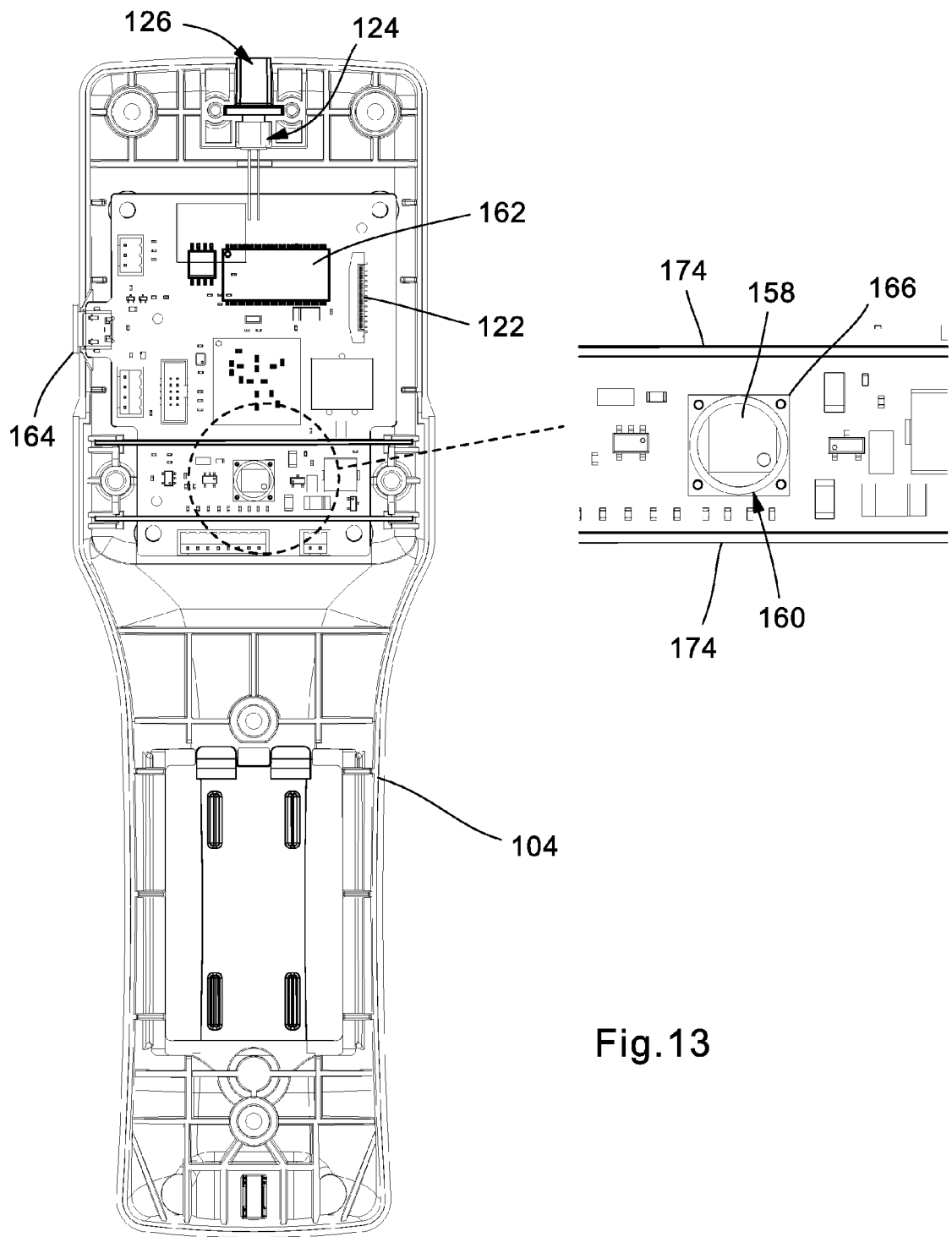
FIG. 13 illustrates internal components and the camera and lens system of a termination tool according to an embodiment of the present invention.
Figure 14:
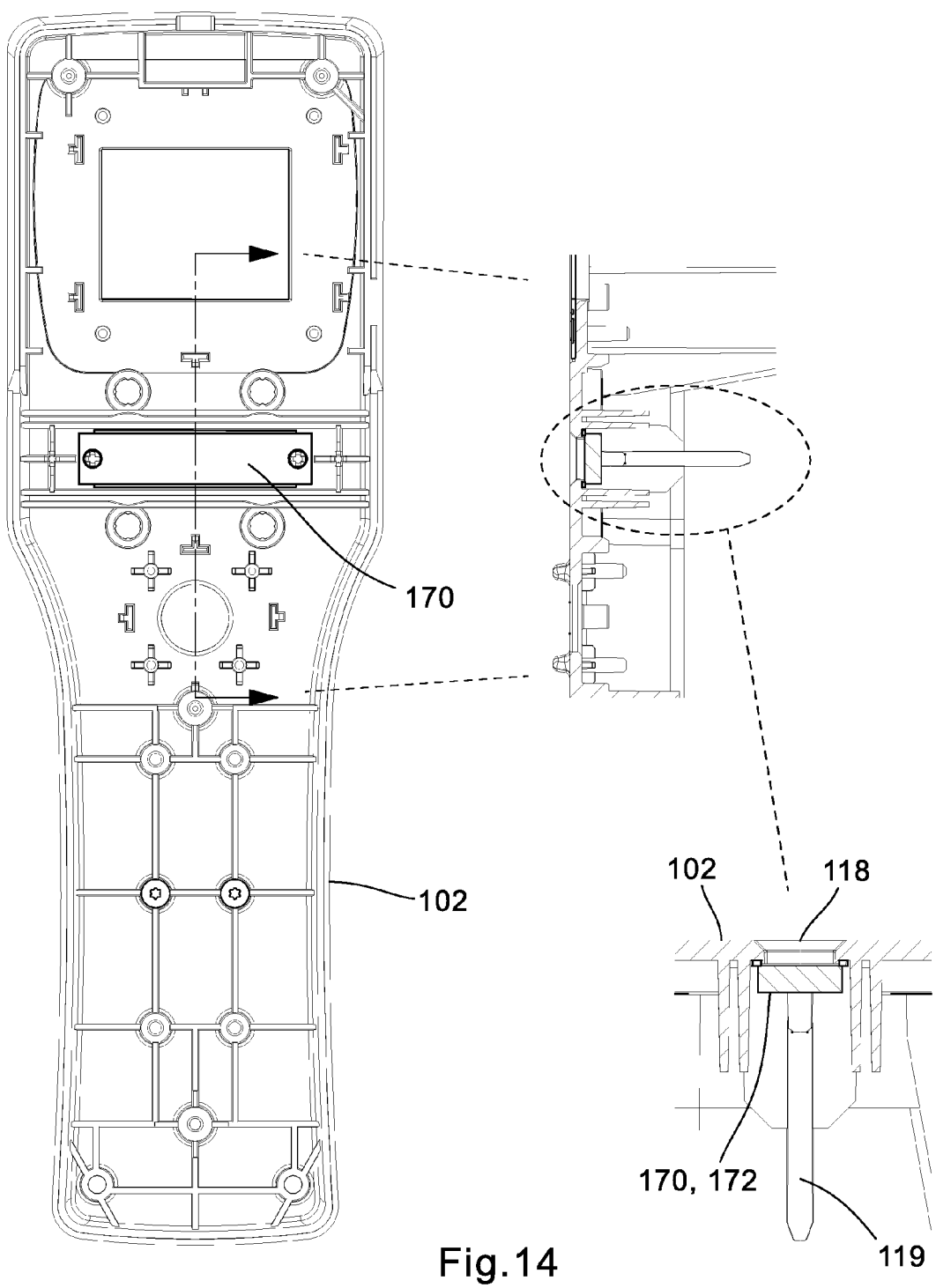
FIG. 14 illustrates the positioning of an infrared filter relative to the top housing of the termination tool according to an embodiment of the present invention.

Due to the termination tool 100 operating (in some embodiments) with light in the IR spectrum, an IR filter 170 is attached beneath the optical window 118 of the top housing 102 (see FIG. 14). This IR filter 170 allows only IR light through to the camera sensor 158 and blocks all visible light. To improve the seal between the IR filter 170 and top housing 102, a gasket 172 is also provided. In addition, as shown in FIG. 13, plastic sheets 174 are used as dust shields to prevent or reduce dust entering into the termination tool 100 and being deposited on the various imaging components, thereby effecting the tool's performance. Sheets 174 are sandwiched between the top and bottom housings 102, 104.

Figure 15:
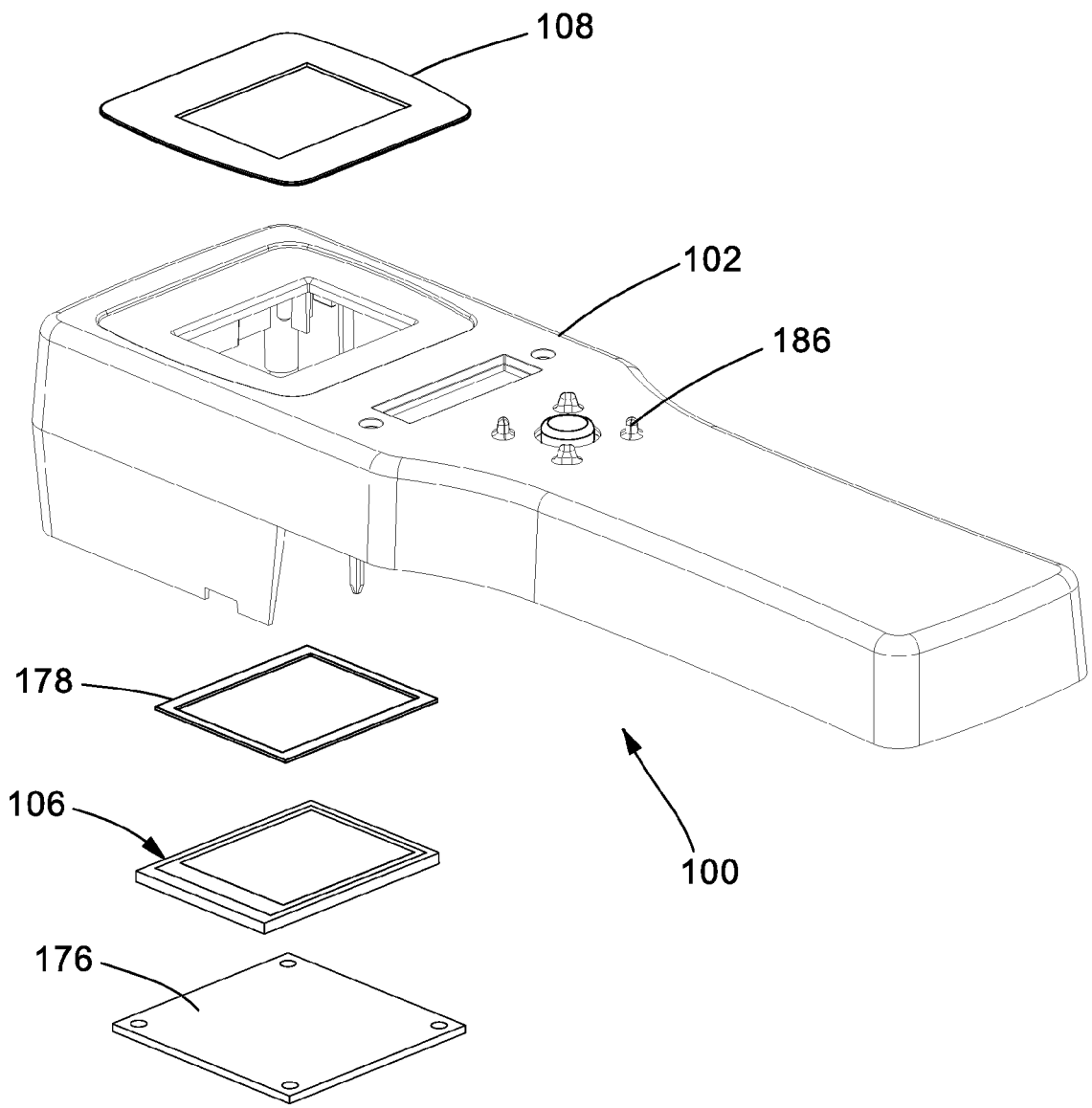
FIG. 15 illustrates the top housing along with LCD components according to an embodiment of the present invention.

To help deliver various information to the user, termination tool 100 is provided with an LCD 106 used to display images, messages, instructions, menus, etc. Referring to FIG. 15, LCD 106 is mounted on a secondary PCB 176 and is heat staked to the top housing 102. A gasket 178 is provided between the top housing 102 and LCD 106 serving as a cushion for LCD 106 and helping prevent dust entry into the tool 100. In addition, a bezel 108 is attached to the top housing 102. The bezel may be made of a plastic sheet which can be screen printed with a brand/model identifier. Moreover, when contrasting colors are used on the bezel relative to the LCD 106 screen, the bezel 108 may provide a picture frame effect making the information shown on the LCD screen more easy to read.

Figure 16:
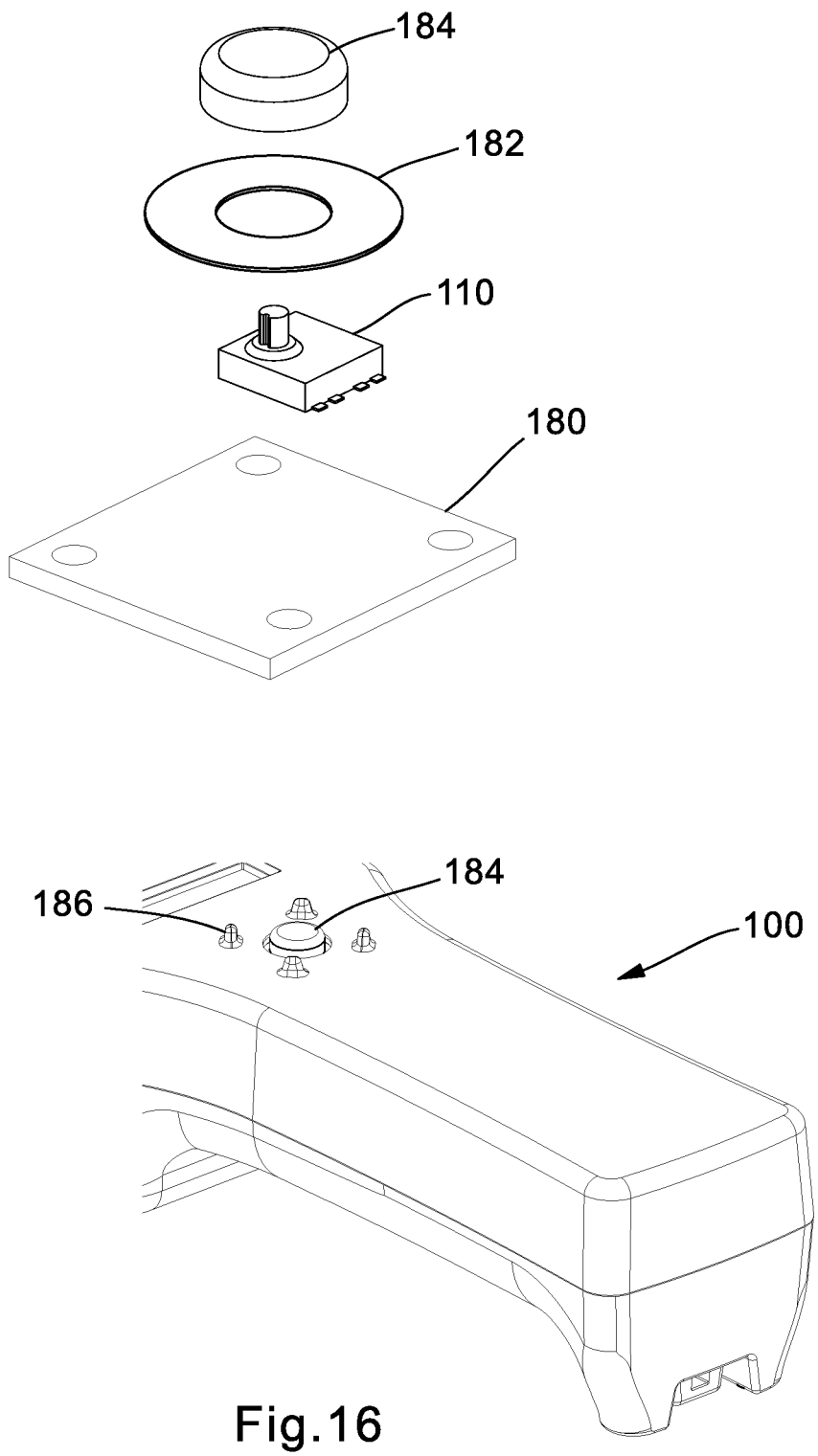
FIG. 16 illustrates an exploded view of the navigation switch with accompanying components according to an embodiment of the present invention.

Termination tool 100 also includes a navigation switch 110 used to navigate and make selection from menus shown on LCD 106. Navigation switch 110 is capable of traversing 4 direction and 1 enter/input when pressed down. It is mounted on a third PCB 180 which is heat staked to the top housing 102 of the tool 100, as shown in FIG. 16. A gasket 182 is provided between the navigation switch button 184 and navigation switch 110 itself. This helps prevent dust entry or accidental contact with PCB 180 through the opening in top housing 102, and provides an aesthetically pleasing cover for the opening in the top housing 102 around the button 184. Four projections serving as a button guard 186 are provided around the periphery of the button 184 to prevent unintentional selection and to provide protection of the switch during accidental falls.

Figure 17:
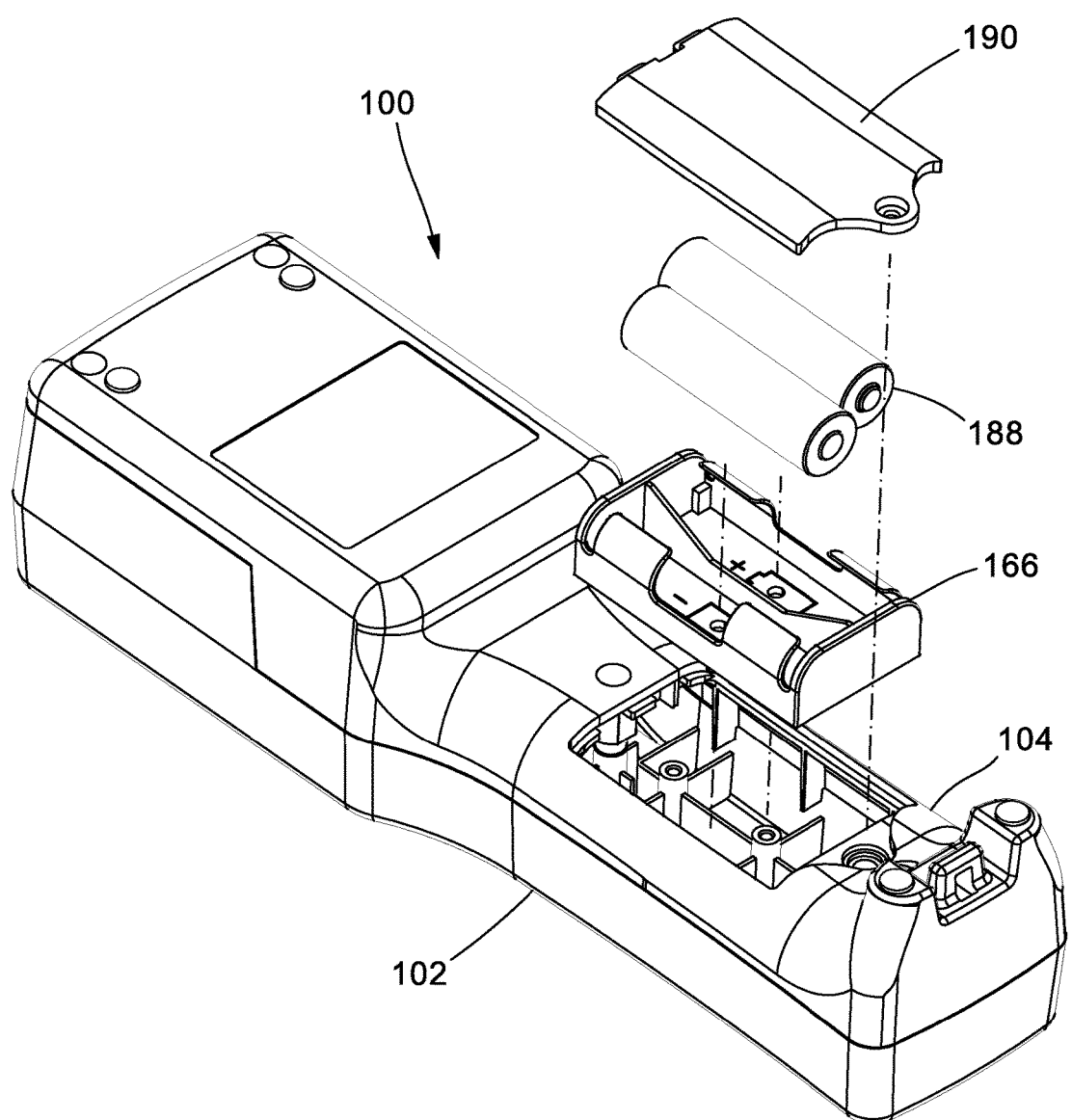
FIG. 17 illustrates an exploded view of the battery components according to an embodiment of the present invention.

Referring to FIG. 17, the termination tool is powered via batteries 188 (e.g., two AA-size batteries) housed in battery housing 116 and covered with a battery door 190. The battery housing 116 is fastened to the top housing 102 using thread forming screws to a pair of bosses in the top housing. To help avoid damage to the battery components and to the rest of the termination tool, features like additional housing reinforcements and elastic cover/case may be provided.

Figure 18:
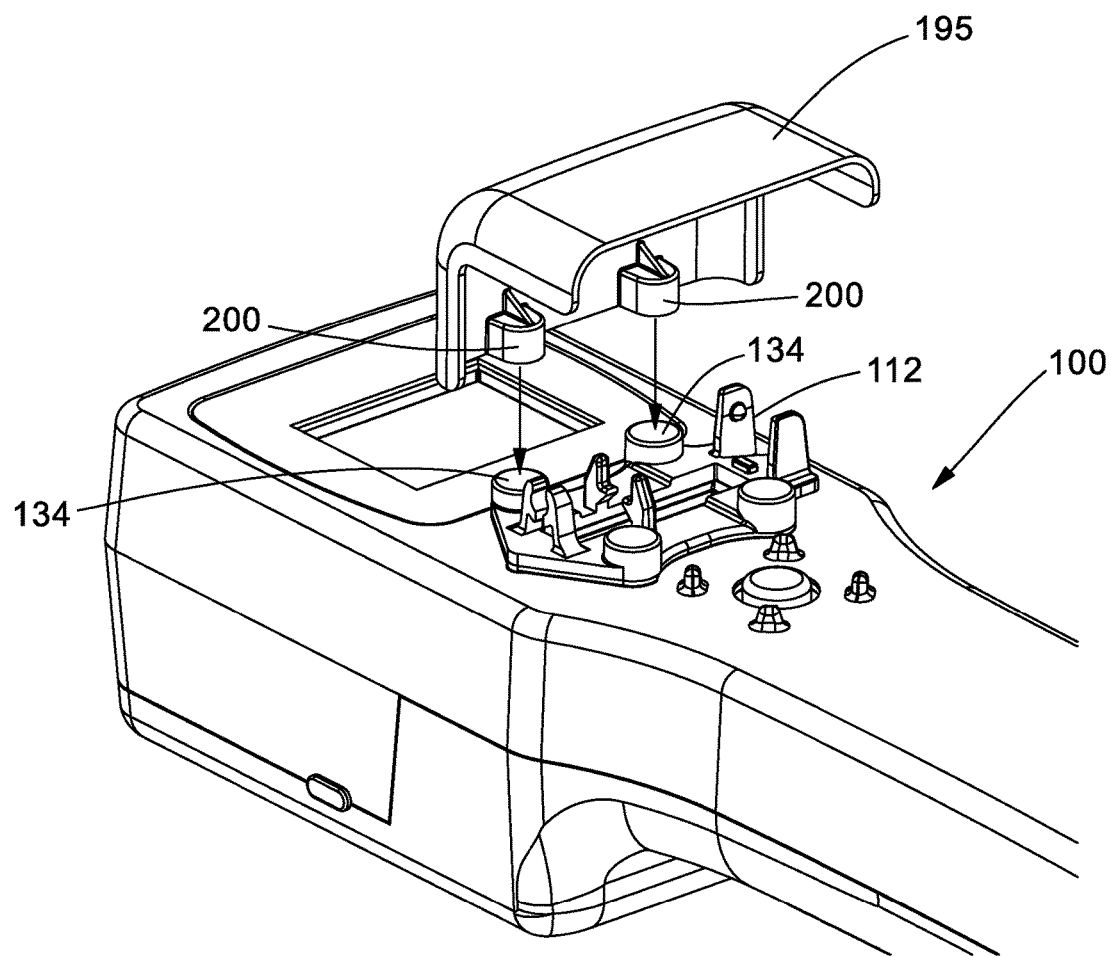
FIGS. 18 and 19 illustrate a termination too used with an embodiment of a cover according to the present invention.
Figure 19:
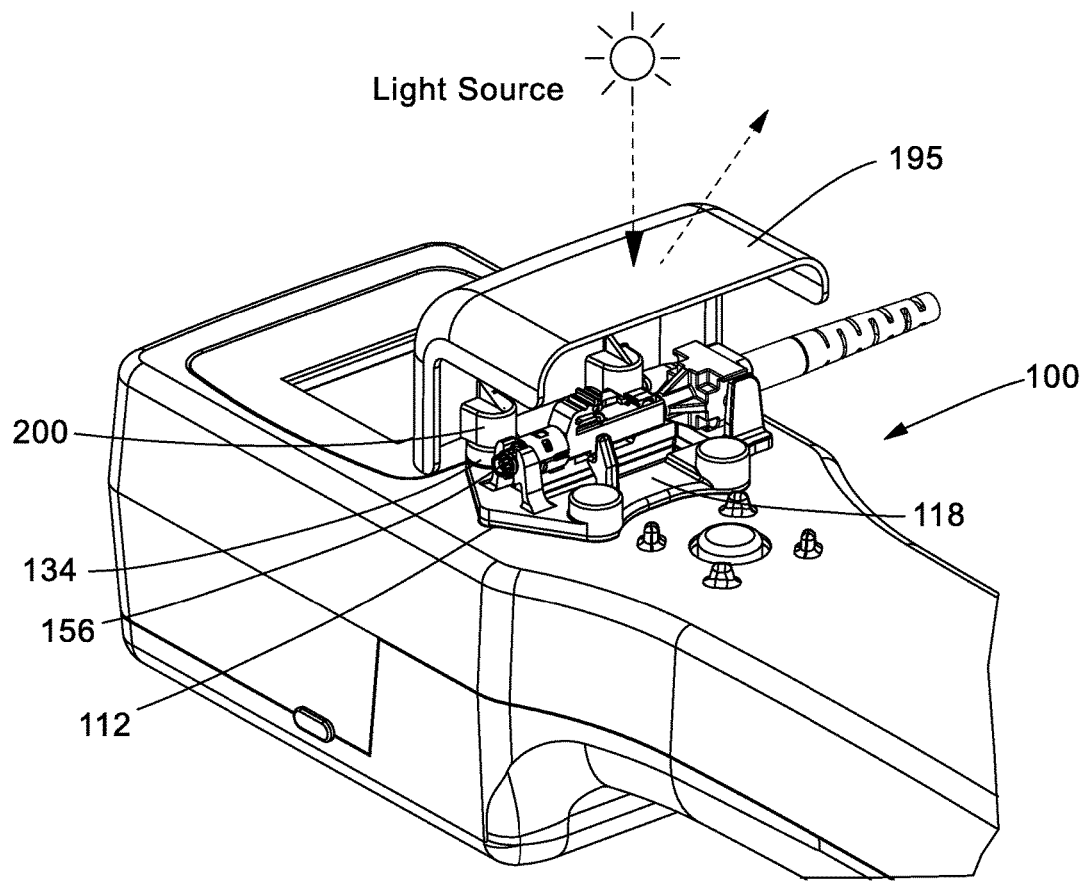
Figure 20A:
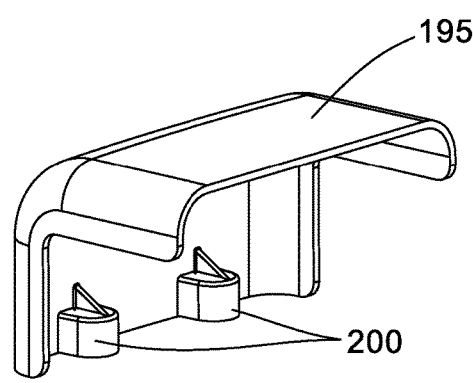
FIGS. 20A and 20B illustrate the cover of FIGS. 18 and 19.
Figure 20B:
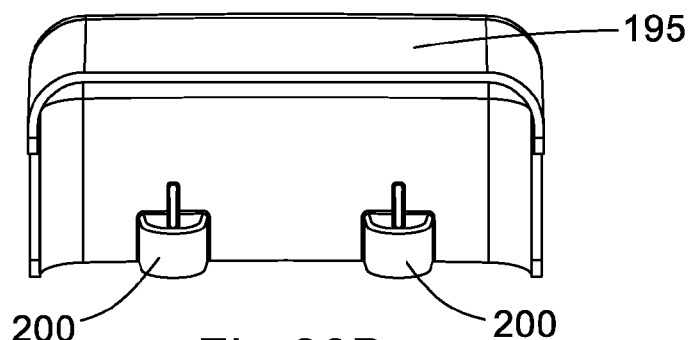
Figure 21:
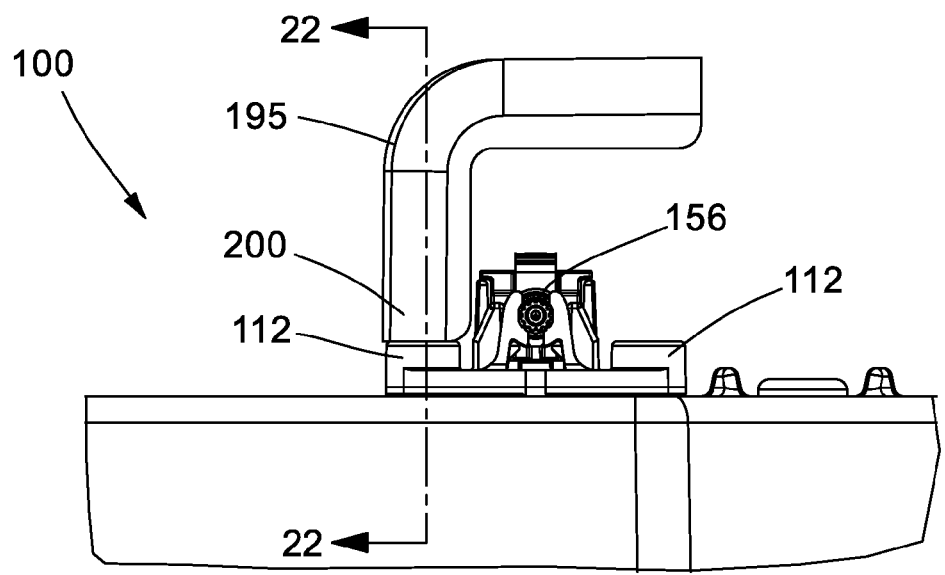
FIGS. 21 and 22 illustrate the cover of FIGS. 18 and 19 mounted on a termination tool according to an embodiment of the present invention.
Figure 22:
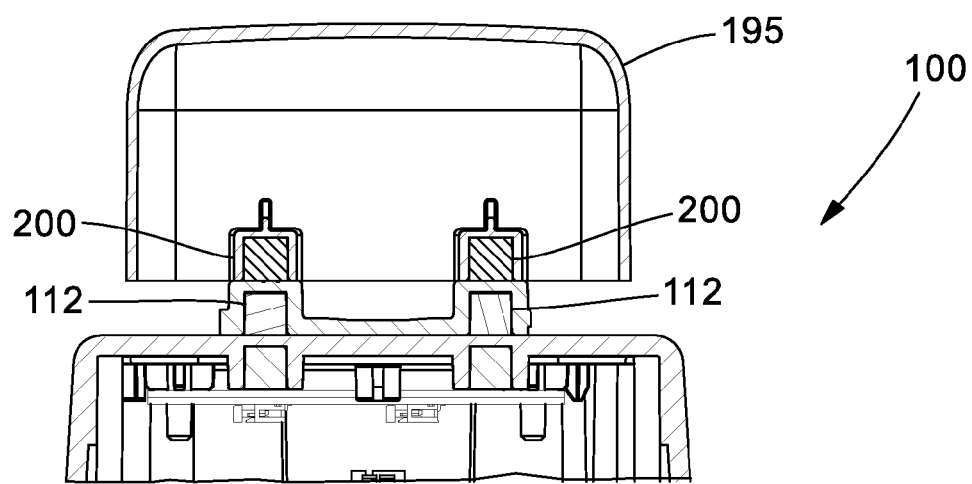
Figure 23:
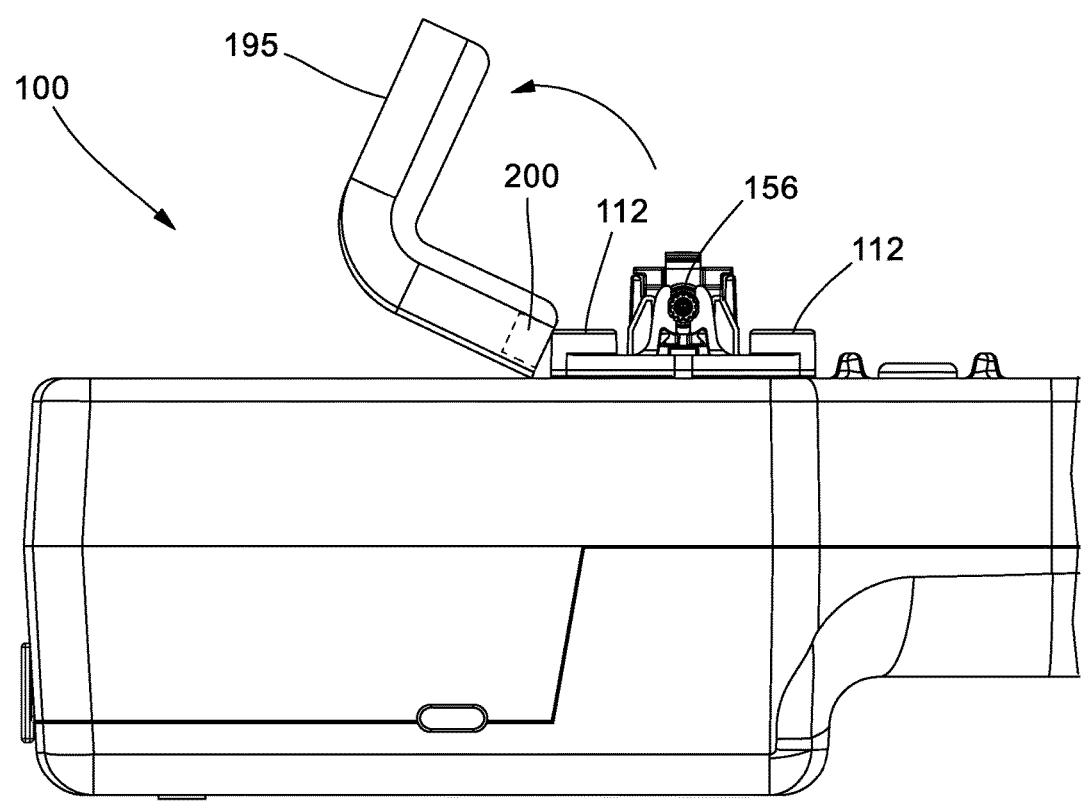
FIG. 23 illustrates the cover of FIGS. 18 and 19 in an open position.
Figure 24:
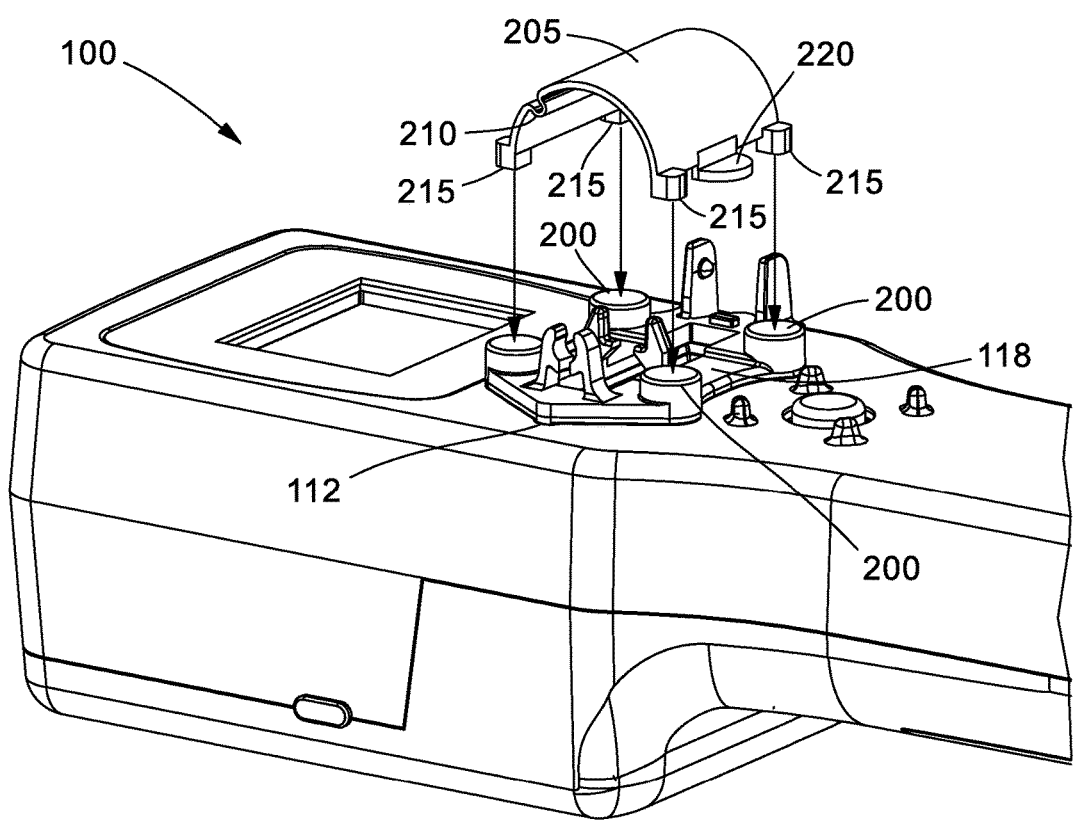
FIGS. 24 and 25 illustrate a termination tool used with another embodiment of a cover according to the present invention.
Figure 25:
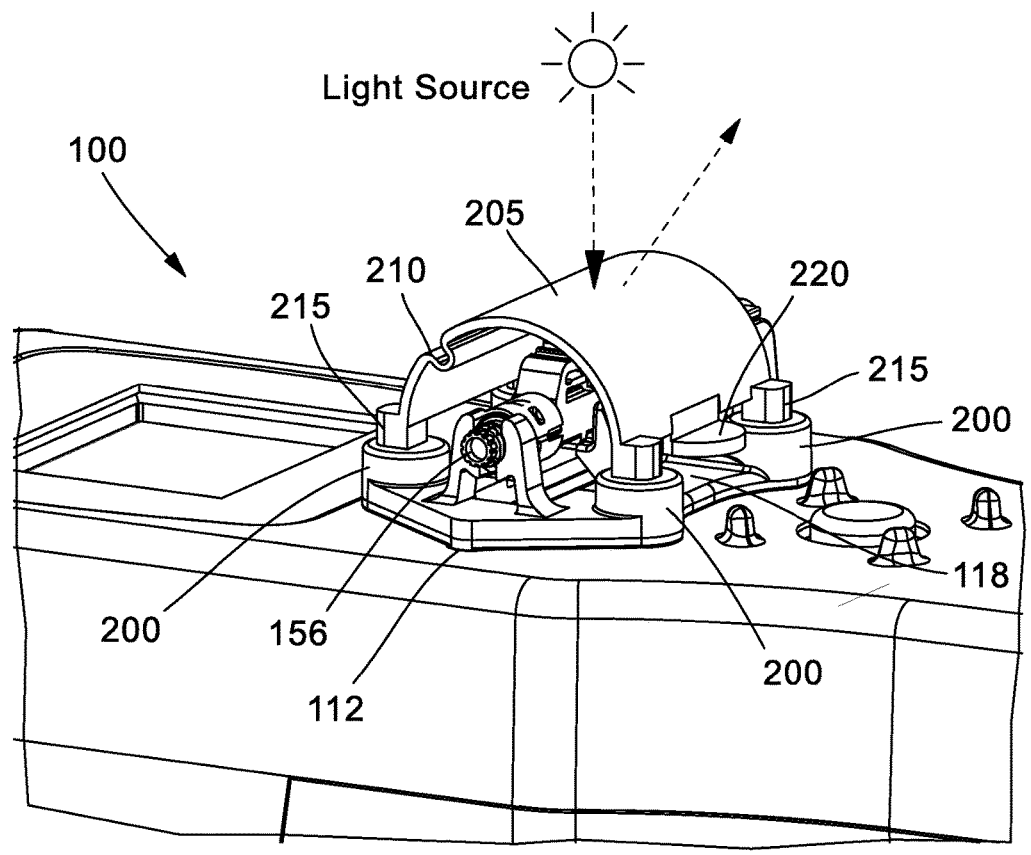
Figure 26:
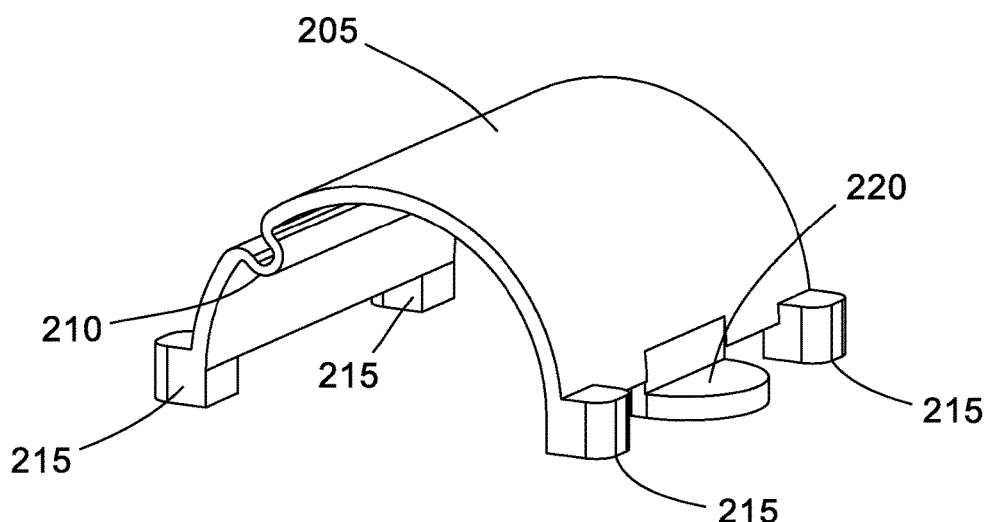
FIG. 26 illustrates the cover of FIGS. 24 and 25.
Figure 27:
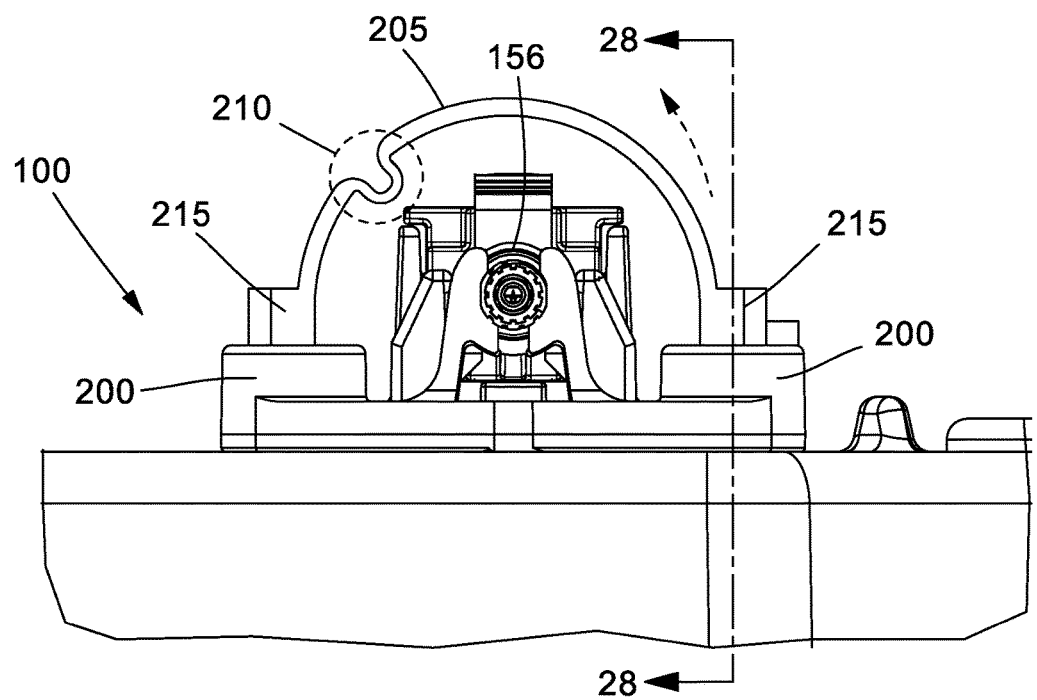
FIGS. 27 and 28 illustrate the cover of FIGS. 24 and 25 mounted on a termination tool according to an embodiment of the present invention.
Figure 28:
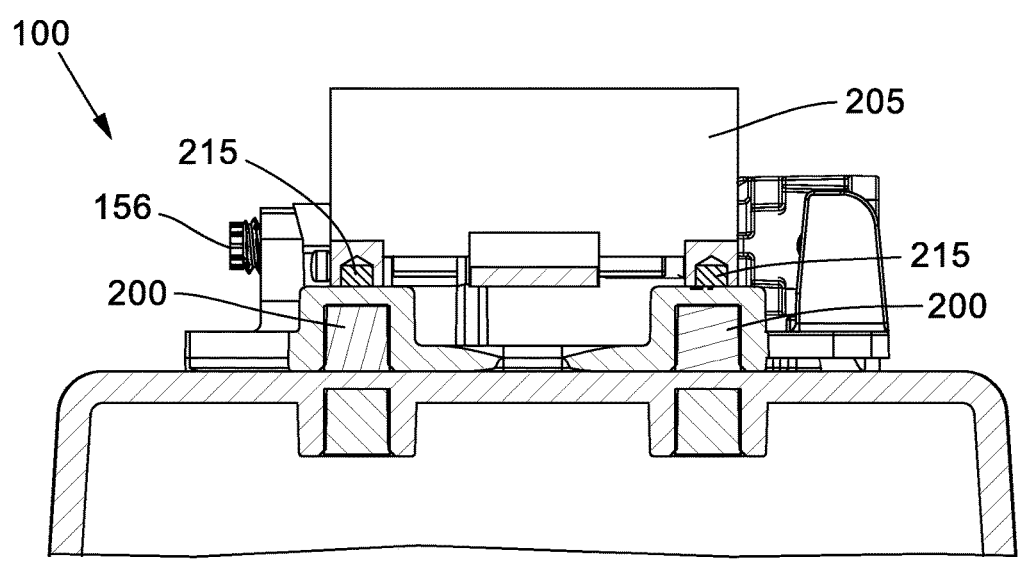
Figure 29:
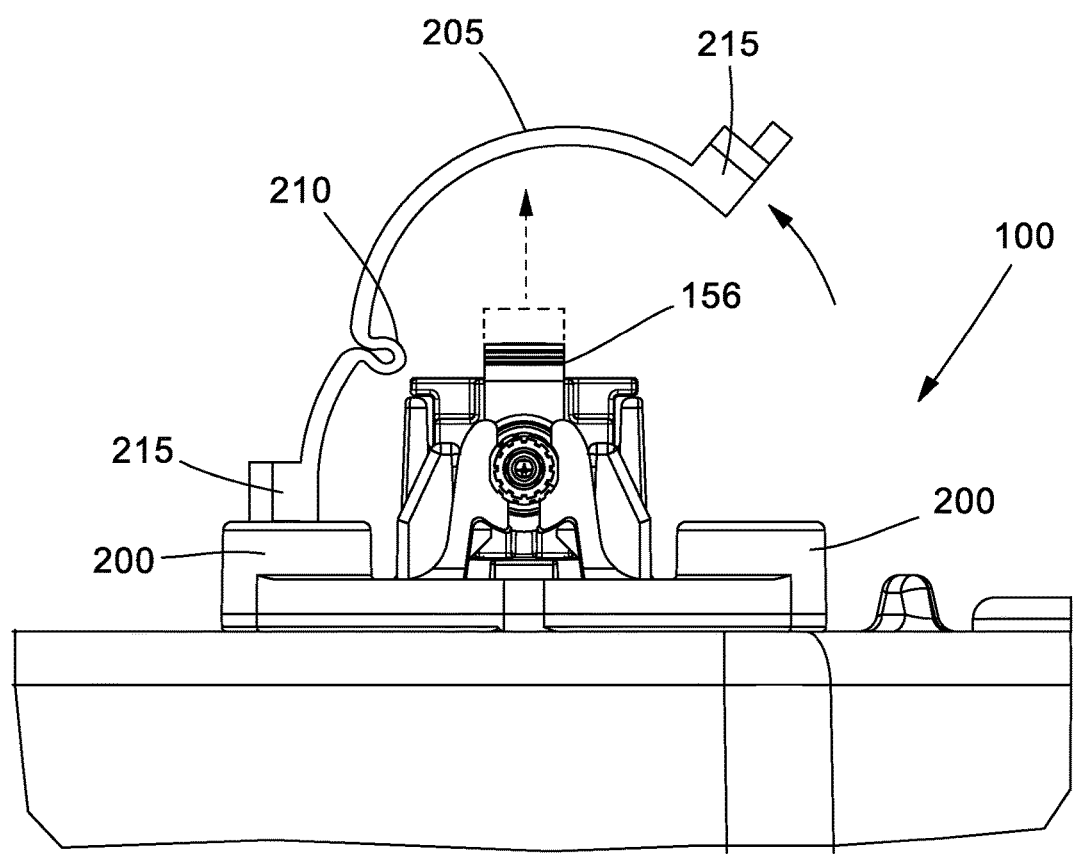
FIG. 29 illustrates the cover of FIGS. 24 and 25 in an open position.

In some embodiments, when operating the termination tool 100 in environments with light sources that emit light at certain wavelengths (e.g., over 790 nm), it may be beneficial to shield the connector 156, cradle 112, and/or the optical window 118 from those light sources. This can be done by providing a cover 195, as shown in FIGS. 18 and 19. The cover 195, illustrated in greater detail alone in FIGS. 20A and 20B, and mounted to the termination tool 100 in FIGS. 21 and 22, includes at least one magnet 200 embedded near the bottom thereof. The magnet(s) 200 are positioned to fit over the magnet(s) 134 in the cradle 112 allowing the cover 195 to be magnetically attached the tool 100 via the cradle. In between termination steps, the cover 195 may be pushed back, as shown in FIG. 23, to allow access to the connector and cradle, and the magnetic interaction between magnets 200 and magnets 134 should prevent the cover 195 from completely detaching from the tool 100.

An alternate embodiment of the cover 205 is shown in FIGS. 24-29 where the cover 205 includes a living hinge 210. The cover 205 includes four feet 215 with magnets installed therein. The positioning of the feet 215 corresponds to the layout of the magnets 134 in the cradle 112. In this configuration, the cover 205 can be securely positioned over the cradle with the magnets 134 and the magnets in feet 215 attracting each other. To open the cover and gain access to the connector, the user can use tab 220 to lift the front portion of the cover 205 such that the front portion rotates about the living hinge 210.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

The invention claimed is:

1. A tool for testing the termination of optical connectors comprising:
 a housing;
 a cradle removeably attached to the housing via a first plurality of magnets;
 a launch fiber;
 a ferrule adapter attached at one end of the launch fiber wherein the ferrule adapter is connected such that it rotates vertically relative to the cradle about a pivot point on the cradle, and
 a removeable cover at least partially covering the cradle via a second plurality of magnets wherein the each magnet of the second plurality of magnets covers one magnet of the first plurality of magnets when the removeable cover is attached to the cradle.

2. The tool of claim 1 wherein the ferrule adapter is connected to the cradle via hemispherical recesses on the ferrule adapter that are engaged by upright beams of the cradle which create a ball and socket joint between the upright beams and the ferrule adapter.

* * * * *